(12) United States Patent
Chen

(10) Patent No.: US 7,435,348 B2
(45) Date of Patent: Oct. 14, 2008

(54) PVC HOLLOW FILTRATION MEMBRANE AND THE PREPARATION METHOD THEREOF

(75) Inventor: Lianggang Chen, Shanghai (CN)

(73) Assignee: Shanghai Litree Purifying Equipment Co., Ltd., Shanghai (CN)

( * ) Notice: Subject to any disclaimer, the term of this patent is extended or adjusted under 35 U.S.C. 154(b) by 470 days.

(21) Appl. No.: 10/567,202

(22) PCT Filed: Aug. 2, 2004

(86) PCT No.: PCT/CN2004/000887

§ 371 (c)(1), (2), (4) Date: Feb. 3, 2006

(87) PCT Pub. No.: WO2005/014150

PCT Pub. Date: Feb. 17, 2005

(65) Prior Publication Data

US 2006/0196825 A1 Sep. 7, 2006

(30) Foreign Application Priority Data

Aug. 6, 2003 (CN) ................................ 03 1 27516

(51) Int. Cl.
*B01D 71/30* (2006.01)
*B01D 71/38* (2006.01)
*B01D 69/08* (2006.01)
*B01D 63/00* (2006.01)

(52) U.S. Cl. ........................... 210/500.23; 210/500.42; 210/500.27; 427/245; 427/246

(58) Field of Classification Search .................. None
See application file for complete search history.

(56) References Cited

U.S. PATENT DOCUMENTS

| 4,020,230 | A | * | 4/1977 | Mahoney et al. | ............. 428/398 |
|---|---|---|---|---|---|
| 4,353,802 | A | * | 10/1982 | Hara et al. | .................. 210/654 |
| 4,478,717 | A | * | 10/1984 | Kurihara et al. | ........ 210/500.28 |
| 4,839,203 | A | * | 6/1989 | Davis et al. | ................. 427/244 |
| 4,882,226 | A | * | 11/1989 | Schutyser et al. | ........... 428/407 |
| 5,039,421 | A | * | 8/1991 | Linder et al. | ................ 210/651 |
| 5,433,852 | A | | 7/1995 | Tseng et al. | |
| 6,180,007 | B1 | * | 1/2001 | Gentile et al. | .......... 210/500.23 |
| 2002/0056675 | A1 | * | 5/2002 | Hegde | ........................ 210/188 |
| 2006/0000766 | A1 | * | 1/2006 | Ji | ......................... 210/500.27 |
| 2008/0023015 | A1 | * | 1/2008 | Arnold et al. | ............... 128/899 |

FOREIGN PATENT DOCUMENTS

| CN | 1415407 | 5/2003 |
|---|---|---|
| JP | 2002-176862 | 6/2002 |

* cited by examiner

*Primary Examiner*—Krishnan S Menon
(74) *Attorney, Agent, or Firm*—Dorsey & Whitney LLP

(57) ABSTRACT

The present invention provides a polyvinyl chloride hollow filtration membrane, which mainly comprises the following components: 30-95 wt. % of polyvinyl chloride and 5-70 wt. % of vinyl chloride-vinyl acetate-maleic anhydride terpolymer, wherein the polymerization degree of polyvinyl chloride is from 700 to 2500; the content of vinyl acetate is 10-19 % and the content of maleic anhydride is 18-40 % on a basis of total weight of the terpolymer; and the absolute viscosity of the terpolymer is 1.2-1.9 mPa·s. A method for preparing such a polyvinyl chloride hollow filtration membrane is also provided in the present invention.

7 Claims, No Drawings

PVC HOLLOW FILTRATION MEMBRANE AND THE PREPARATION METHOD THEREOF

CROSS-REFERENCE TO RELATED APPLICATION

This Application is a Section 371 National Stage Application of International Application No. PCT/CN2004/000887, filed 2 Aug. 2004 and published as WO 2005/014150 A1 on 17 Feb. 2005, which claims the priority from the Chinese patent application 03127516.8, filed 06 Aug. 2003, the subject matter of which are hereby incorporated by reference in its entirety.

FIELD OF THE INVENTION

The present invention relates to a polyvinyl chloride hollow filtration membrane, especially to a modified polyvinyl chloride hollow filtration membrane having good permeability and anti-pollution properties.

BACKGROUND OF THE INVENTION

Due to the characteristics such as energy conservation, environmental protection and easy operation of the membrane isolation technique, the industry of membrane isolation has developed rapidly, and the application scope thereof has been extended to the fields such as biology, medicament, environmental protection, energy sources, municipal water treatment, and waste water treatment. A hollow filtration membrane, due to its large filtration area per unit volume, low cost of the manufacture of equipment, and the realization of cross flow filtration, makes the life time of the filter element greatly extended. However, the current commercialized hollow filtration membrane products generally utilize materials such as polysulfones (PS), polyvinylidene fluorides (PVDF), polyethersulfones (PES), and polyacrylonitriles (PAN), which cannot be widely used due to their low ratios of quality to price.

Polyvinyl chlorides are attracting more and more attention from research units, as they have good physical properties and chemical stability, are resistant to microorganism erosion, acids and bases, and have a lot of sources and varieties, the price of which is low. However, since the hydrophilicity of polyvinyl chloride materials themselves is not good, polyvinyl chloride filtration membranes have no good penetration property and are easily polluted, thus causing the filtration property thereof to decline rapidly.

To produce liquid separation membranes of polyvinyl chloride having excellent properties, it is necessary to improve the hydrophilicity thereof after the membrane is formed. To realize it, the following methods may be employed: (1) copolymerization modification, i.e. introducing other chemical substances having hydrophilic groups into vinyl chloride chain segments by copolymerization; (2) plasma surface modification, i.e. treating polyvinyl chloride powders or membranes with plasma to produce hydrophilic groups containing chlorine on the surfaces of polyvinyl chloride powders or membranes; and (3) surface grafting modification (one of filtration membrane chemical modification), i.e. making polyvinyl chloride molecule chain produce free radicals by high energy radiation such as Y-ray and electron beam, then introducing the desired hydrophilic groups into the membrane surface by graft polymerization. All of the above three methods can realize the improvement of the hydrophilicity property of polyvinyl chloride filtration membrane, but their industrialization is not easy, as the cost is high.

The fourth modification method for polyvinyl chloride filtration membrane is called as co-blend modification, i.e. adding a co-blend material, which is compatible with polyvinyl chloride materials and has hydrophilic groups, into a slurry for preparing the membrane. The less the difference of solubility parameters (representing the solubility property of a macromolecule material) between the two materials is, then the better the compatibility of the two materials is, the more stable the slurry for preparing the membrane is, the more uniform the aperture of the formed membrane is, and the less the drawbacks are. Furthermore, the better the hydrophilicity property of the selected co-blend material is, and the higher the ratio thereof in the slurry for preparing the membrane is, then the higher the water flux of the membrane is, and the better the anti-pollution property thereof is. Therefore, the selection of proper co-blend material and the use of the proper molding technique can produce a polyvinyl chloride hollow filtration membrane having good mechanical properties, high water flux and good anti-pollution property, which has a good quality and low cost.

SUMMARY OF INVENTION

An object of the present invention is to provide a polyvinyl chloride hollow filtration membrane having good penetration property and remarkable anti-pollution property.

Another object of the present invention is to provide a method for preparing a polyvinyl chloride hollow filtration membrane.

The polyvinyl chloride hollow filtration membrane of the present invention mainly comprises the following components:

30-95 wt. % of polyvinyl chloride, and 5-70 wt. % of vinyl chloride-vinyl acetate-maleic anhydride terpolymer, wherein the polymerization degree of polyvinyl chloride is from 700 to 2500; the content of vinyl acetate is 10-19% and the content of maleic anhydride is 18-40% on a basis of total weight of the terpolymer; and the absolute viscosity of the terpolymer is 1.2-1.9 mPa·s.

The present invention also provides a method for preparing a polyvinyl chloride hollow filtration membrane, which comprises the following steps:

formulating a spray-membrane slurry having the following components on a basis of total weight of the slurry:

| | |
|---|---|
| polyvinyl chloride | 5.6-14.1% |
| vinyl chloride-vinyl acetate-maleic anhydride terpolymer | 0.4-13.0% |
| thermal stabilizer | 0.1-0.7% |
| solvent | 61.5-85.1% |
| hole-making agent | 1.1-10.4% | wherein the polymerization degree of polyvinyl chloride is from 700 to 2500; the content of vinyl acetate is 10-19% and the content of maleic anhydride is 18-40% on a basis of total weight of the terpolymer; and the absolute viscosity of the terpolymer is 1.2-1.9 mPa·s;

mixing the polyvinyl chloride, vinyl chloride-vinyl acetate-maleic anhydride terpolymer, heat stabilizer and solvent within the above proportion ranges, dissolving the mixture at 40-90° C., then adding a hole-making agent therein, dissolving for 10-24 hours with continuous stirring, and standing for 10-15 hours to form the spray-membrane slurry; and spraying the membrane by a known method to solidify the membrane, thereby forming the polyvinyl chloride hollow filtration membrane of the present invention.

DETAILED DESCRIPTION OF INVENTION

In the polyvinyl chloride hollow filtration membrane of the present invention, the content of polyvinyl chloride is 30-95 wt. %, preferably 60-80 wt. %, and the content of the vinyl chloride-vinyl acetate-maleic anhydride terpolymer is 5-70 wt. %, preferably 20-40 wt. %. Said filtration membrane further inevitably contains a trace quantity of residual solvent and other impurities.

In the vinyl chloride-vinyl acetate-maleic anhydride terpolymer used in the present invention, the content of vinyl acetate is 10-19 wt. %, preferably 13-15 wt. %, and the content of maleic anhydride is 18-40 wt.%, preferably 20-28 wt. %. The terpolymer contains a strong hydrophilic group (—COOH), which has a water contact angle of 40 degree and a solubility parameter of 9.5-9.7 $(J/cm^3)^{1/2}$. The solubility parameter of said vinyl chloride-vinyl acetate-maleic anhydride terpolymer is very close to that of the polyvinyl chloride (9.6 $(J/cm^3)^{1/2}$), so the compatibility of these two materials are very good, and can be blended almost in any ratio.

In the method for preparing the membrane of the present invention, the solvent may be selected from the group consisting of dimethyl formamide (DMF) or dimethyl acetamide (DMAC). The thermal stabilizer may be selected from the group consisting of barium stearate, organotin, and a lead compound, preferably thiolmethyltin. The main function of the stabilizer is to avoid the thermal degradation of the polyvinyl chloride produced in the process of formulating and heating the slurry. The hole-making agent can increase the percentage of open area of the membrane, enhance the penetration property of the membrane, and will be helpful to improve the toughness thereof. The hole-making agent can be selected from the group consisting of polyvinyl pyrrolidone (PVP) and polyethylene glycol (PEG), preferably polyethylene glycol (PEG). The slurry for preparing the membrane can be prepared at a temperature of 40-90° C., preferably 50-80° C.

The vinyl chloride-vinyl acetate-maleic anhydride terpolymer used in the present invention has good hydrophilicity property, and physical and chemcial properties, and is compatible with polyvinyl chloride, the cost of which is relatively low. The addition of the vinyl chloride-vinyl acetate-maleic anhydride terpolymer can greatly improve the hydrophilicity and anti-pollution properties of the formed membrane. For example, when the weight ratio of vinyl chloride-vinyl acetate-maleic anhydride terpolymer to polyvinyl chloride is 3:7, the water contact angle of the filtration membrane is 57 degree, while the water contact angle of the complete polyvinyl chloride filtration membrane is 66 degree.

The spray-membrane slurry of the present invention can be used to spray the membrane by a known dry jet-wet spinning method, then be solidified in a coagulant to form a membrane, wherein the coagulant is water or an aqueous solution containing a certain solvent. Thus, the polyvinyl chloride hollow filtration membrane of the present invention, which has excellent properties, is prepared.

EXAMPLES

Now the present invention is further detailedly illustrated in combination with the following examples. However, it is appreciated that these examples are only intended to illustrate the invention, but not to limit the scope of the invention.

Example 1

A uniform spray-membrane slurry was prepared according to the following procedure: 11.5 wt. % of polyvinyl chloride, 5.0 wt. % of vinyl chloride-vinyl acetate-maleic anhydride terpolymer and 0.3 wt. % of thiolmethyltin stabilizer were mixed; then the mixture, together with 76.3 wt. % of DMAC, were poured into a stirring vessel at a temperature of 78° C. with the stirring rotation speed of 110 rpm; after they were basically dissolved, 6.9 wt. % of PEG was added therein; then they were stirred for 10 hours at a constant temperature of 78° C., the vacuum debubbling was performed, and they were stood for 12 hours to form the spray-membrane slurry. The resulting spray-membrane slurry was extruded through an spinneret by a dry jet-wet spinning method, then it was passed through a water coagulant to produce a hollow filtration membrane. The resulting membrane has a retention molecule weight of 80,000 daltons, and has a pure water filtration yield of 800 $L/m^2h$ at a pressure of 0.1 MPa and a water temperature of 25° C.

Example 2

A uniform spray-membrane slurry was prepared according to the following procedure: 9.4 wt. % of polyvinyl chloride, 3.3 wt. % of vinyl chloride-vinyl acetate-maleic anhydride terpolymer and 0.2 wt. % of thiolmethyltin stabilizer were mixed; then the mixture, together with 83.9 wt. % of DMAC, were poured into a stirring vessel at a temperature of 60° C. with the stirring rotation speed of 90 rpm; after they were basically dissolved, 3.2 wt. % of PEG was added therein; then they were stirred for 10 hours at a constant temperature of 60° C., the vacuum debubbling was performed, and they were stood for 12 hours to form the spray-membrane slurry. The resulting spray-membrane slurry was extruded through an spinneret by a dry jet-wet spinning method, then it was passed through a water coagulant to produce a hollow filtration membrane. The resulting membrane has a retention molecule weight of 150,000 daltons, and has a pure water filtration yield of 1160 $L/m^2h$ at a pressure of 0.1 MPa and a water temperature of 25° C.

What is claimed is:

1. A polyvinyl chloride hollow filtration membrane, which mainly comprises the following components:
   30-95 wt. % of polyvinyl chloride, and
   5-70 wt. % of vinyl chloride-vinyl acetate-maleic anhydride terpolymer,
   wherein the polymerization degree of polyvinyl chloride is from 700 to 2500; the content of vinyl acetate is 10-19% and the content of maleic anhydride is 18-40% on a basis of total weight of the terpolymer; and the absolute viscosity of the terpolymer is 1.2-1.9 mPa·s.

2. The polyvinyl chloride hollow filtration membrane of claim 1, wherein the content of polyvinyl chloride is 60-80 wt. %, and the content of the terpolymer is 20-40 wt. %.

3. The polyvinyl chloride hollow filtration membrane of claim 1, wherein the content of vinyl acetate is 13-15% and the content of maleic anhydride is 20-28% on a basis of total weight of the vinyl chloride-vinyl acetate-maleic anhydride terpolymer.

4. A method for preparing a polyvinyl chloride hollow filtration membrane, which comprises the following steps:

formulating a spray-membrane slurry having the following components on a basis of total weight of a slurry for preparing the membrane:

| | |
|---|---|
| polyvinyl chloride | 5.6-14.1% |
| vinyl chloride-vinyl acetate-maleic anhydride terpolymer | 0.4-13.0% |
| thermal stabilizer | 0.1-0.7% |
| organic solvent | 61.5-85.1% |
| hole-making agent | 1.1-10.4% | wherein the polymerization degree of polyvinyl chloride is from 700 to 2500; the content of vinyl acetate is 10-19% and the content of maleic anhydride is 18-40% on a basis of total weight of the terpolymer; and the absolute viscosity of the terpolymer is 1.2-1.9 mPa·s;

mixing the polyvinyl chloride, vinyl chloride-vinyl acetate-maleic anhydride terpolymer, heat stabilizer and organic solvent within the above proportion ranges, dissolving the mixture at 40-90° C., then adding a hole-making agent therein, dissolving for 10-24 hours with continuous stirring, and standing for 10-15 hours to form the spray-membrane slurry; and spraying the membrane by a known method to solidify the membrane, thereby forming the polyvinyl chloride hollow filtration membrane.

5. The method of claim 4, wherein the spray-membrane slurry is prepared at a temperature of 50-80° C.

6. The method of claim 4, wherein the thermal stabilizer is one or more selected from the group consisting of barium stearate, organotin and a lead compound.

7. The method of claim 6, wherein the thermal stabilizer is thiolmethyltin.

* * * * *